B. BROIDO.
METHOD AND APPARATUS FOR MAKING BOILER SECTIONS.
APPLICATION FILED DEC. 17, 1918.

1,331,047.

Patented Feb. 17, 1920.

2 SHEETS—SHEET 1.

BENJAMIN BROIDO. Inventor

By HIS Attorney O. I. Thiele

B. BROIDO.
METHOD AND APPARATUS FOR MAKING BOILER SECTIONS.
APPLICATION FILED DEC. 17, 1918.

1,331,047.  Patented Feb. 17, 1920.
2 SHEETS—SHEET 2.

BENJAMIN BROIDO, Inventor
By HIS Attorney O. V. Thiele

UNITED STATES PATENT OFFICE.

BENJAMIN BROIDO, OF NEW YORK, N. Y., ASSIGNOR TO LOCOMOTIVE SUPERHEATER COMPANY, OF NEW YORK, N. Y., A CORPORATION OF DELAWARE.

METHOD AND APPARATUS FOR MAKING BOILER-SECTIONS.

1,331,047.     Specification of Letters Patent.     Patented Feb. 17, 1920.

Application filed December 17, 1918. Serial No. 267,107.

*To all whom it may concern:*

Be it known that I, BENJAMIN BROIDO, citizen of Russia and resident of New York city, in the county of New York and State of New York, have invented certain new and useful Improvements in Methods and Apparatus for Making Boiler-Sections, of which the following is a specification.

This invention relates to water tube boilers, and more particularly to methods of making sections comprising two headers and connecting water tubes.

Figure 1:
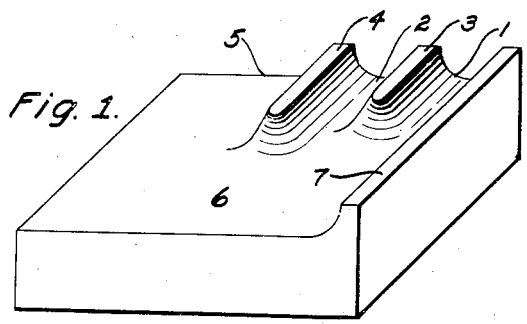
Figure 4:
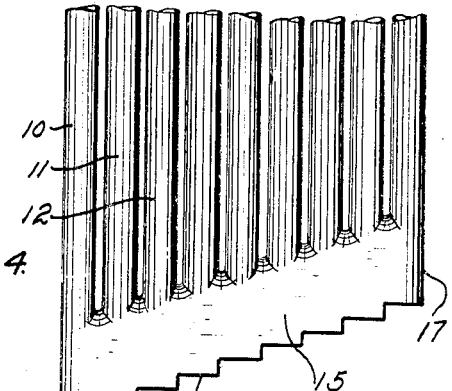
Figure 2:
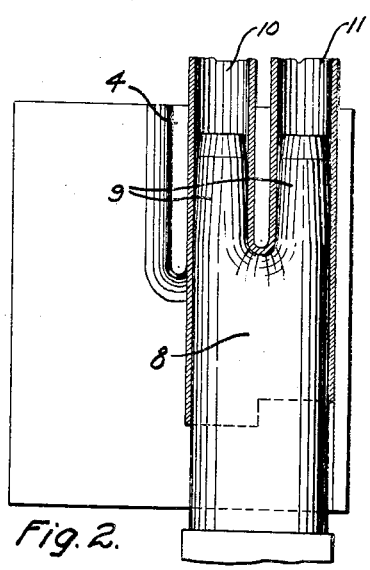
Figure 17:
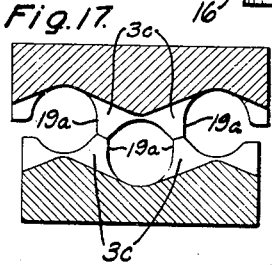
Figure 5:
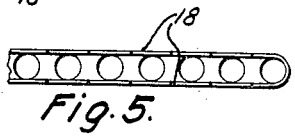
Figure 6:
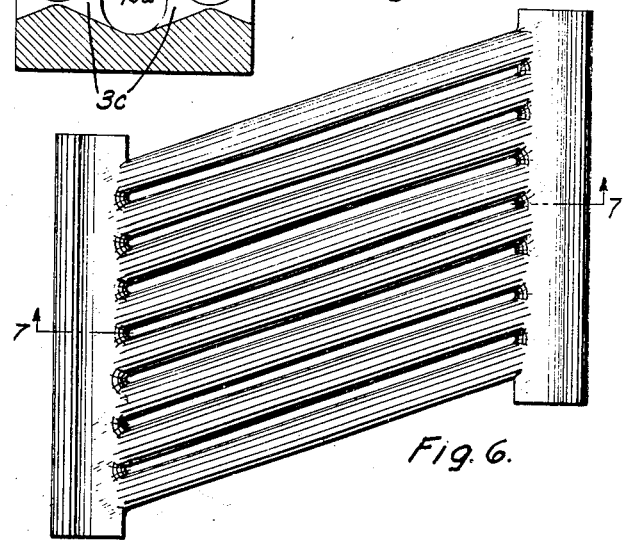
Figure 7:
Figure 8:
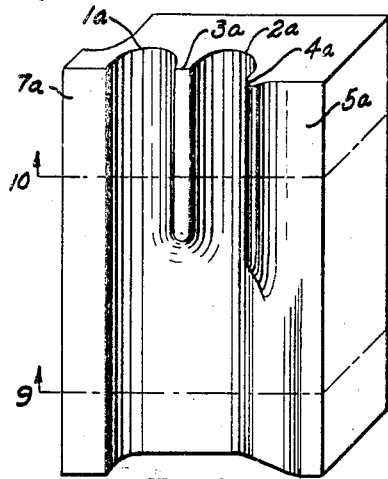
Figure 11:
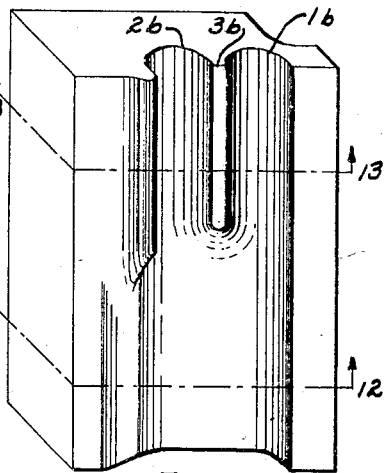

The purpose of the invention is to provide a method of and mechanism for producing such sections. The invention is an extension of the one disclosed in United States Patent 1,264,455, granted to Charles H. True on April 30th, 1918. Familiarity with that disclosure is assumed in the following description of my invention. This description is to be read in connection with the accompanying two sheets of drawings, in which Figure 1 shows in projection one of a pair of symmetrical dies used in the process; Fig. 2 shows in a plan view, the first, and Fig. 3 in a similar view the second step in the process; Figs. 4 and 5 are fragmentary side and end views respectively of a section at one stage of its manufacture; Fig. 6 is a side view of a completed section; Fig. 7 is a sectional view on line 7—7 of Fig. 6; Figs. 8 and 11 are projections and Figs. 9, 10, 12, and 13 sections of dies used in making a modified section; Figs. 14ª to 14ᵍ illustrate steps in making this modified form, the completed section being shown in front view in Fig. 15; while a fragmentary side view of another modification appears in Fig. 16; and Fig. 17 is a sectional view of a modified form of the die.

In the process and by the mechanism described in the patent referred to above, units or sections for use in radiators, boilers, etc., are produced, consisting of two parallel headers connected by tubes, the tubes running at right angles to the headers. The present modified process produces structures similar to those mentioned but having the angle at which the tubes lie with respect to the headers something less than a right angle.

The dies used in my process are also similar to those used in the one of the patent. The difference is clearly brought out in Figs. 1, 2 and 3. The half of the female die shown in Fig. 1 has two semi-cylindrical grooves 1 and 2, separated by the wall 3. Separated from groove 2 by wall 4 is a clearance space 5. Walls 3 and 4 are identical in cross-sectional shape and both extend inward from one end of the die but terminate some distance short of the other end. The wall 4, it should be noted, extends somewhat farther inward than wall 3. Their inner ends are not abrupt, but both merge gradually from their greatest height to the surface 6, which is continuous with the bottom of grooves 1 and 2 and clearance space 5. The wall 7, which forms the outer side of groove 1, extends from end to end of the die.

When the other half of the die, which, as stated above, is symmetrical with the one shown and described, is placed in position so that its walls 7, 3, and 4 are in registry with those of the first half, there will be formed two cylindrical bores and an open sided channel or clearance space, all in line and connected with each other for a certain distance from one end, the connecting space between the two cylindrical bores extending into the die farther than that connecting the clearance space with one of the bores.

The male die which coöperates with the die just described, is like that of the patent, and comprises a body portion 8 and two legs 9—9. It conforms generally in shape to the interior of the female die with which it coöperates, but is smaller, so that, when inserted in the female die, it is spaced everywhere from its walls by an amount equal approximately to the thickness of the pipes.

To produce a unit or section, such as referred to above, with my die, I first join two pipes 10 and 11 by steps corresponding exactly to those used previously in this art for this purpose, *i. e.*, I first heat them suitably for a distance from their ends, place and by suitable mechanism clamp them between the two halves of the female die in the position suggested in Fig. 2, where only one of the halves of the female die is shown; and let the male die perform its inward stroke by means of suitable mechanism. Fig. 2 shows the relative position of the dies at this stage.

By its inward stroke the male die has split and spread outward the two neighboring walls, and in doing so has, in coöperation with the walls of the female die, caused the edges of the split portion of one pipe to become firmly welded to the edges of the split portion of the other.

This, it will be seen by those familiar with the art, entails no new steps.

Figure 3:
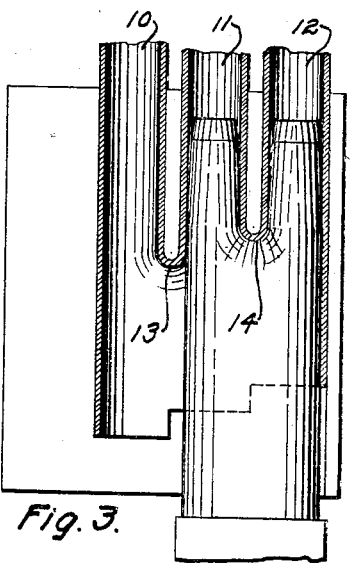

After the male die has been withdrawn and the female die opened, the two pipes 10 and 11, now joined, are transferred, after having first again been raised to a welding heat, to the position indicated in Fig. 3; and a third pipe 12, similarly heated, is placed as shown.

The female die is then closed, and the male die again makes its inward stroke, joining pipe 12 to pipe 11 in doing so. It will be noted from the figure, that bottom 13 of the portion joining pipes 10 and 11 is "stepped" with respect to the bottom 14 of the portion joining pipes 11 and 12. This is of course due to the different relative lengths of the walls 3 and 4, and is the essential feature of my improvement.

By steps similar to those described and which will be perfectly evident to the reader, a fourth pipe may be joined to pipe 12, the pipes 11 and 12 occupying the positions of pipes 10 and 11 respectively of Fig. 3; and any desired number of additional pipes may be added. The pipes already joined are successively fed outward through the clearance space 5.

The resulting structure is illustrated in Fig. 4, an end view being shown in Fig. 5.

It has been assumed in the above that the pipe lengths used are all of the same length. By now reversing the structure produced, the opposite ends of the pipes are joined by similar steps.

As seen in Figs. 4 and 5, the header 15, uniting the pipes 10, 11, 12, etc., is not yet complete, but is merely an opensided, troughlike affair, with its two ends 16 and 17 closed. Its upper edges 18 are stepped. To make it a complete header, the edges 18 are trimmed off, and then the edges are bent toward each other and welded together, and the ends 16 and 17 opened and provided with suitable bosses or other structures for connections. These steps for completing the headers are carried out in the known manner described in the patent, or by any other preferred manner, and do not form any part of the present invention, except as steps in forming the complete product.

A header completed is shown in side view in Fig. 6 and in section on line 7—7 of Fig. 6 in Fig. 7.

Figure 16:
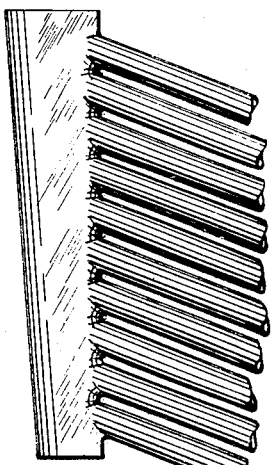
Figure 14A:
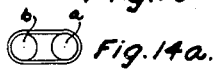
Figure 14B:
Figure 14D:
Figure 14F:
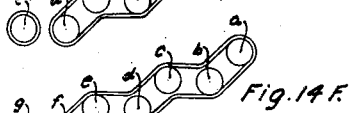
Figure 14C:
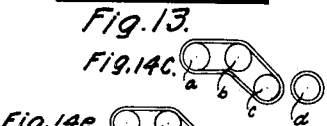
Figure 14E:
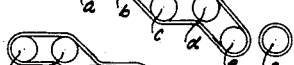
Figure 14G:
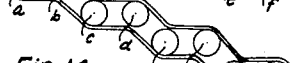

When such a unit or section is used for boiler purposes, it may prove desirable to have the cross sectional area of the header greater as we approach the top, as illustrated in Fig. 16. It will be evident that this can readily be done by proper trimming of the edges 18 of the incomplete header 15 of Fig. 4, or by gradually varying the distance the pipes are inserted in the die.

Figure 9:
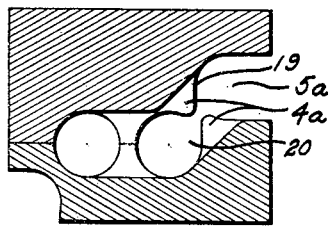
Figure 12:
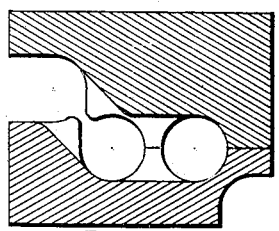
Figure 10:
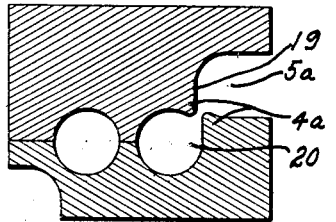
Figure 13:
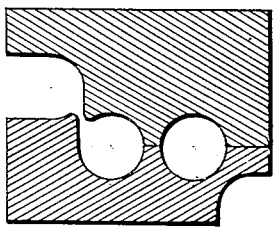

In some cases it is desirable to have the tubes in a section such as we are herein dealing with not one directly above the other, but so arranged that they are alternately offset to either side of a central plane. The die and process herein described can, by a modification, be adapted to produce such a unit or section. Two forms of dies for this purpose are shown in the drawings. The first of these, illustrated in Figs. 8 to 13, uses two separate sets of dies alternately. One half of the female die of one set is shown in Fig. 8, and one half of the female die of the second set in Fig. 11. Figs. 9 and 10 are sections of the complete die half of which is shown in Fig. 8, the sections being taken on lines 9—9 and 10—10 respectively of that figure; Figs. 12 and 13 are similar sections on lines 12—12 and 13—13 of Fig. 11.

Referring first to the die shown in Figs. 8 to 10, the semi-cylindrical grooves $1^a$ and $2^a$ with the intervening wall $3^a$, the wall $7^a$, and the two cylindrical bores resulting when the two halves of the die are placed together, correspond strictly to similar parts of the die first described. The clearance space $5^a$, however, and the wall $4^a$, corresponding to clearance space 5 and wall 4 respectively, are somewhat modified. The former is not in line with the two cylindrical bores, but is offset with reference to them; and the wall $4^a$ is partly cut away, on each die, as at 19 and 20, so that the two halves of the die may perform their closing motion without interference with the work in the die.

The die illustrated in Figs. 11 to 13 is a "left" replica of the one just described.

A male die like that described above coöperates with each of these two female dies.

Figs. $14^a$ to $14^g$ will aid in understanding the use of these dies. The two pipes $a$ and $b$ are first joined in the die shown at the left. Next pipe $c$ is joined to $b$ in the same die. Pipe $d$ is then joined to $c$ in the die shown at the right, and then $e$, $f$, $g$, etc., are joined in the positions indicated, the dies being used alternately. Evidently as many pipes can be added as is desired. The other ends are then joined by a similar alternate use of the dies, after which the headers are finished in any preferred manner.

Figure 15:

A front view of such a header, completed, is shown in Fig. 15.

A single die for making this header is shown in Fig. 17. In order not to interfere with the pipes the two parts of this die are properly relieved at the points 19ᵃ of the walls 3ᶜ. These walls 3ᶜ extend inward from one end of the die by different distances. The male die has in this case three branches to extend into the three channels. It again conforms in shape to but is in size smaller than the inside of the coöperating parts of the female die.

In operation, three pipes, properly heated are placed into and clamped in the female die, and are simultaneously joined by a single stroke of the male die. They are then moved along so the last one of them occupies one of the outer channels, the other two lying outside of the die, but properly alined with it. Two other pipes are at the same time placed in the other two channels, they and the portion of the three joined pipes to which the middle one is to be welded, having been suitably heated. A stroke of the male die joins them. The process is repeated as often as desired, two pipes being joined to the structure at each operation, and the completed portion being continuously fed outward from the die in the same direction. The other ends of the pipes are then joined by similar steps, after which the headers are finished as in the previously described case.

It will be manifest that there are ways in which the dies I use and the process itself may be varied without departing from the spirit of my invention.

What I claim is:

1. The process of forming headers on sets of pipes comprising the following steps: slitting a pipe longitudinally along two lines for certain different distances; slitting two other pipes longitudinally each along one line for a distance; bending outward the portions of each pipe adjacent to the sides and bottom of each slit; welding the edges of these portions of the two second-named pipes to those of the first named pipe.

2. The process of forming headers on sets of pipes comprising the following steps: slitting a pipe longitudinally along one line for a certain distance; doing the same for a second pipe; bending outward those portions of each pipe adjacent to the sides and bottom of the slit; welding together the edges of the bent-out portions of one to those of the second; slitting the wall of the second pipe longitudinally along a line removed from the first slit, and for a distance different from its other slit; slitting a third pipe longitudinally along one line for a certain distance; bending outward the portions adjacent to the sides and bottoms of these two slits; and welding together the edges of the bent-out portions.

3. The process of forming headers on sets of pipes comprising joining the ends of two of the pipes by the steps of heating them, slitting them for a suitable distance from their ends, pressing the portions adjacent to each side and to the bottom of the slits outwardly, welding the edges of said portions of one pipe to those of the other; joining, by a similar set of steps, a third pipe to one of the first two, and in such relative position that the imaginary line connecting the bottoms of the two welds is oblique to the pipes.

4. The process of forming headers on sets of pipes at an oblique angle to them which comprises slitting those walls of the pipes, which are to lie opposite each other in the finished product, longitudinally for a distance from the end, the slits of those pipes slitted in two places differing in length by the same amount in each case; pressing the portions adjacent to each side and the bottom of each slit outwardly; welding the edges of said portions of one pipe to those of another in such sequence that the longer slits all face the same way, so that a line connecting the bottoms of the welds runs obliquely to the pipes; closing the open end of the resulting structure, thus forming a header; and providing an opening for connections to the header.

5. A die for forming headers on sets of parallel pipes, comprising a female and a male member, the female member having spaces adapted to receive those pipes, said spaces being separated from each other by walls extending into the die from one end but terminating short of the other, one of them extending farther than the other, the male member having a body portion and two legs for entering said female member, said body portion and legs being shaped generally complementary to the coöperating portions of the female member but smaller so that, when inserted in it, it is spaced everywhere from its walls.

6. A die for forming headers on sets of parallel pipes, comprising a female and a male member, the female member having spaces adapted to receive those pipes, said spaces being separated from each other by walls extending into the die from one end but terminating short of the other, one of them extending farther than the other, the male member having a body portion and legs for entering said female member, said body portion and legs being shaped generally complementary to the coöperating portions of the female member but smaller so that when inserted in it, it is spaced everywhere from its walls.

7. A die for forming headers on sets of pipes comprising a female and a male member, the female member comprising two symmetrical halves, which, in operative position, form two cylindrical bores and a groove all parallel and in the same plane and separated by walls of equal thickness, said walls extending inward from one end and terminating at points remote from the other end by different distances; the male member comprising a body portion and two legs, all shaped generally complementary to the coöperating portions of the female member, but smaller so that, when inserted in it, it is everywhere spaced from its walls.

Signed at New York, in the county of New York and State of New York, this 10th day of December, A. D. 1918.

BENJAMIN BROIDO.

Witnesses:
MABLE F. COX,
R. M. HARRIS.